United States Patent [19]

Dienes

[11] Patent Number: 4,732,628
[45] Date of Patent: Mar. 22, 1988

[54] METHOD OF SEALING AND REPAIRING ELECTRICAL CABLES

[75] Inventor: Zoltan B. Dienes, Annandale, N.J.

[73] Assignees: Thomas & Betts Corporation, Raritan, N.J.; Zoltan B. Dienes, Annandale, N.J.

[21] Appl. No.: 8,903

[22] Filed: Jan. 30, 1987

Related U.S. Application Data

[63] Continuation of Ser. No. 335,399, Dec. 29, 1981, Pat. No. 4,666,537, which is a continuation-in-part of Ser. No. 143,414, Apr. 24, 1980, Pat. No. 4,358,634.

[51] Int. Cl.$^4$ ............................................. H01B 13/06
[52] U.S. Cl. ......................................... 156/48; 156/49; 156/54; 156/56; 156/94; 174/88 R; 174/116
[58] Field of Search ........................ 156/48, 49, 52, 54, 156/56, 94; 174/5 R, 41, 70 A, 88 R, 92, 116, 136, 138 F

[56] References Cited

U.S. PATENT DOCUMENTS

| | | |
|---|---|---|
| 1,988,604 | 1/1935 | Merrill et al. ............................ 173/28 |
| 2,624,689 | 1/1953 | Peters et al. ............................ 154/104 |
| 2,967,795 | 1/1961 | Bollmeier et al. ................... 154/2.22 |
| 3,161,210 | 12/1964 | Lööf ........................................ 138/28 |
| 3,186,047 | 6/1965 | Schwester et al. ............. 248/16 PB |
| 3,332,138 | 7/1967 | Garner ................................ 156/54 X |
| 3,361,605 | 10/1968 | Gilbert ....................................... 156/48 |
| 3,519,728 | 7/1970 | Gillemot ................................... 174/76 |
| 3,781,458 | 12/1973 | May ..................................... 156/56 X |
| 3,814,645 | 6/1974 | Fletcher .................................... 156/94 |
| 3,889,047 | 6/1975 | Carver ...................................... 174/84 |
| 4,198,173 | 4/1980 | Zehren ................................ 156/49 X |
| 4,257,630 | 3/1981 | Bartell et al. ........................... 285/21 |
| 4,545,830 | 10/1985 | Dienes et al. ........................... 156/48 |
| 4,666,537 | 5/1987 | Dienes ..................................... 156/48 |

Primary Examiner—Robert A. Dawson
Attorney, Agent, or Firm—Robert M. Rodrick; Salvatore J. Abbruzzese

[57] ABSTRACT

An exposed portion of an electrical cable is sealed by applying a sealant material to the exposed cable and then placing the ends of a split unitary cover over the sealant material in overlapped disposition. The cover is then compressed into contact with the sealant material. In repairing a damaged cable sheath, a reinforcing member may be placed over the sealant material prior to placing the cover thereover.

9 Claims, 6 Drawing Figures

METHOD OF SEALING AND REPAIRING ELECTRICAL CABLES

CROSS-REFERENCE TO RELATED APPLICATION

This is a continuation of application Ser. No. 335,399 filed Dec. 29, 1981, now U.S. Pat. No. 4,666,537 issued May 19, 1987 which is a continuation-in-part of application Ser. No. 143,414 filed Apr. 24, 1980, now U.S. Pat. No. 4,358,634 issued Nov. 9, 1982.

FIELD OF THE INVENTION

This invention relates to a method of sealing exposed electrical cables and, in a particular use, to a method of repairing damaged electrical cables.

BACKGROUND OF THE INVENTION

Cables containing many small diameter wires are often used in telephone communication systems that are typically installed underground. All such cables capable of being installed underground must be sealed against moisture and otherwise protected against the hostile environment. Not infrequently, due to line failure or routine maintenance, one or more cables must be joined, i.e., many wires within spliced together. Thus, entry into the cable systems and effective resealing is necessary.

Currently, there are a variety of insulating covers and protectors for electrical connections, cable splices, repair and the like. While effective in providing protection and a seal for the connections, installation of the known covers is relatively time-consuming, often requiring specialized tools and equipment which in an underground tunnel of limited space are difficult to handle and operate.

One such known protector employs a rigid outer shell that is installed around the splice area and filled with urethane or other hard resins. The splice area is totally and permanently encapsulated and is not readily reenterable.

Another known closure utilizes a rigid outer cover, but is filled with a petroleum jelly or other similar, very viscous material. For access to the splice area, this petroleum jelly must be removed, creating problems in removal, temporary storage or disposal.

Another commonly used protector is a heat-shrinkable sleeve. In addition to requiring special heating tools, there is the potential for deterioration of the integrity of the material due to overheating. Also, the available heat-shrinking materials for such applications are typically of high durometer to withstand the hostile environment, making re-entry as by slicing more difficult and limiting the flexibility of the spliced area.

While epoxy-type resins are known to be used for cable repair, they are disadvantageously limited by temperature. Such resins also have a tendency to crack under stress and often have poor adhesive properties for a seal to the cable.

SUMMARY OF THE INVENTION

It is an object of the invention to provide an improved method for sealing an exposed electrical cable.

It is another object to provide an improved method for repairing damaged electrical cables.

In accordance with the invention, an exposed electrical cable is sealably covered by applying sealant material onto the exposed cable and then placing the ends of a split unitary protective cover over the sealant material in overlapped disposition. The split cover is then compressed mechanically so as to contact the cover with the sealant material and provide thereby a seal between the cover and the cable. In the preferred form, the cover contains a coating of sealant on its surface that is arranged to contact the sealant material and also to provide a seal between the overlapped portions of the cover.

In another form of the invention a method is provided for repairing damaged electrical cable. In this method, a sealant is applied onto the damaged cable and a reinforcing member is placed thereon. A unitary, heat-cured protective cover with split ends is then placed over the reinforcing member, the cover ends being in overlapped disposition. The split cover is then non-heatably compressed into contact with the reinforcing member to provide a seal between the cover and the cable. In the preferred arrangement, the reinforcing member is wrapped circumscribingly around the damaged area covering the sealant applied thereto.

DETAILED DESCRIPTION OF THE PREFERRED EMBODIMENTS

Figure 1:
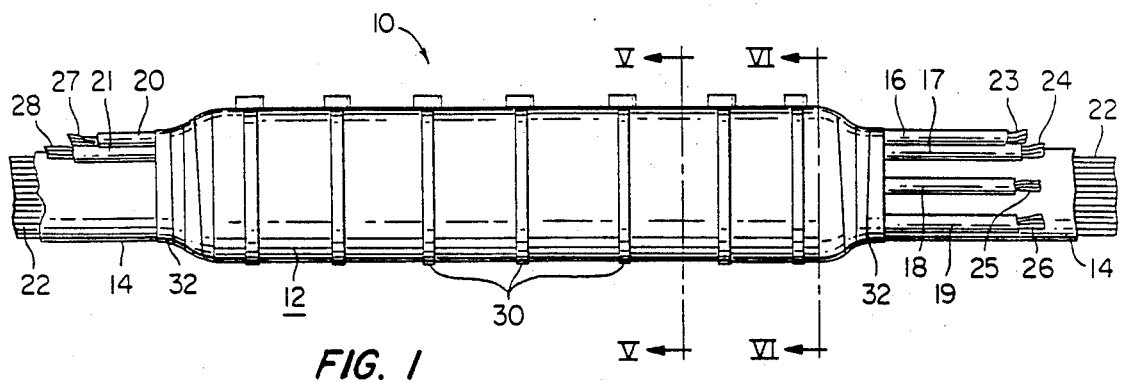
FIG. 1 is a side elevational view of a sealed splice of electrical cables as made in accordance with a method of the present invention, partly broken away at the cable ends to reveal conductors therein.

Referring to the drawing, there is shown in FIG. 1 a sealed splice indicated generally as numeral 10. A cover 12 sealably encloses an electrical cable 14 and protects the connection therein of electrical cables such as cables 16, 17, 18 and 19 entering the cover 12 on one side and cables 20 and 21 entering the cover on the other side. The cables are of conventional construction, each having an outer jacket of insulation, cable 14 having inner conductors 22, cables 16, 17, 18 and 19 having inner conductors 23, 24, 25 and 26, respectively, and cables 20 and 21 having inner conductors 27 and 28, respectively. In the preferred embodiment, cables 16, 17, 18 and 19 as well as cables 20 and 21 are of approximately the same size and smaller than the cable 14. While the preferred arrangement of the splice 10 contemplates a connection of up to four smaller cables extending from each side of the cover 12, connection of more or less cables entering one or both sides of cover 12 may also be accomplished.

The cover 12 is secured around the cables to effect a sealed connection, as will be described, preferably by a plurality of spaced locking straps 30, radially tightened against the cover 12, the straps 30 being in the form of cable ties as described in U.S. Pat. No. 3,186,047 and assigned to the same assignee as is the present invention. Other radially compressive means, such as tape and clamps, may also be used to hold the cover 12 tightly around the cables. To provide additional sealing protection, both ends of the cover 12 may be covered by an adhesive tape 32 that overlaps the ends of the cover 12 and extends onto the outer insulation of the cables.

Figure 2:
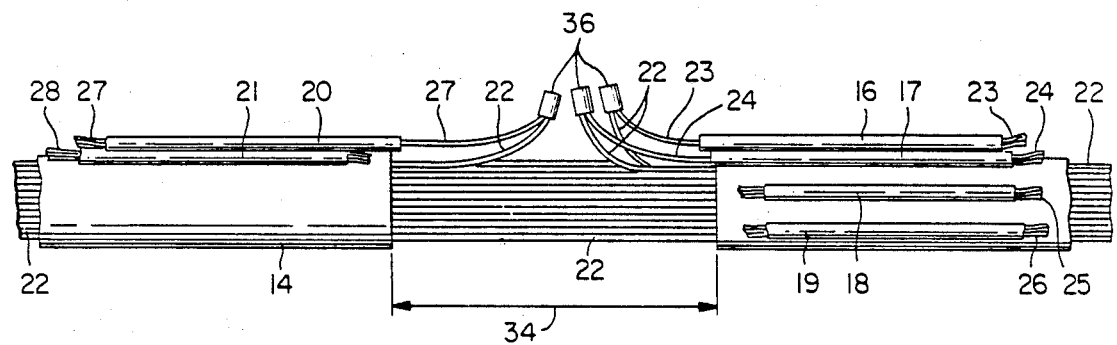
FIG. 2 is a view of the splice of FIG. 1 in a preliminary stage of preparation with the protective cover removed to show the connections of cable conductors.

In preparing the cable splice 10, the larger cable 14, as shown in FIG. 2, is stripped of its outer insulation for an axial portion designated by arrow 34 so as to expose the inner conductors 22. Similarly, the outer insulation of the smaller cables is removed to expose the inner conductors 23, 24, 25, 26, 27 and 28 for connection to the conductors 22. Although the conductors of all the smaller cables are connected, only the connections of cables 16, 17 and 20 are shown in FIG. 2 for purposes of clarity and illustration. The conductors 23, 24 and 27 of these cables, respectively, are individually coupled to a conductor 22 as by a ferrule 36 or other standard connector as known in the art. The connected smaller cables are positioned on the cable 14 to extend substantially parallel and coaxial therewith. Subsequent to the connection of the conductors, it is preferable that the exposed connected conductors be covered with a layer of sealant tape (not shown in FIG. 2) or other suitable electrically insulating material. The outer insulation of the cable 14 adjacent both sides of the tape-covered exposed portion 34 is also preferably covered by sealant tape, the smaller cables 16, 17, 18, 19, 20 and 21 being pressed against the tape for an axial extent on both sides respectively of the portion 34.

Figure 3:
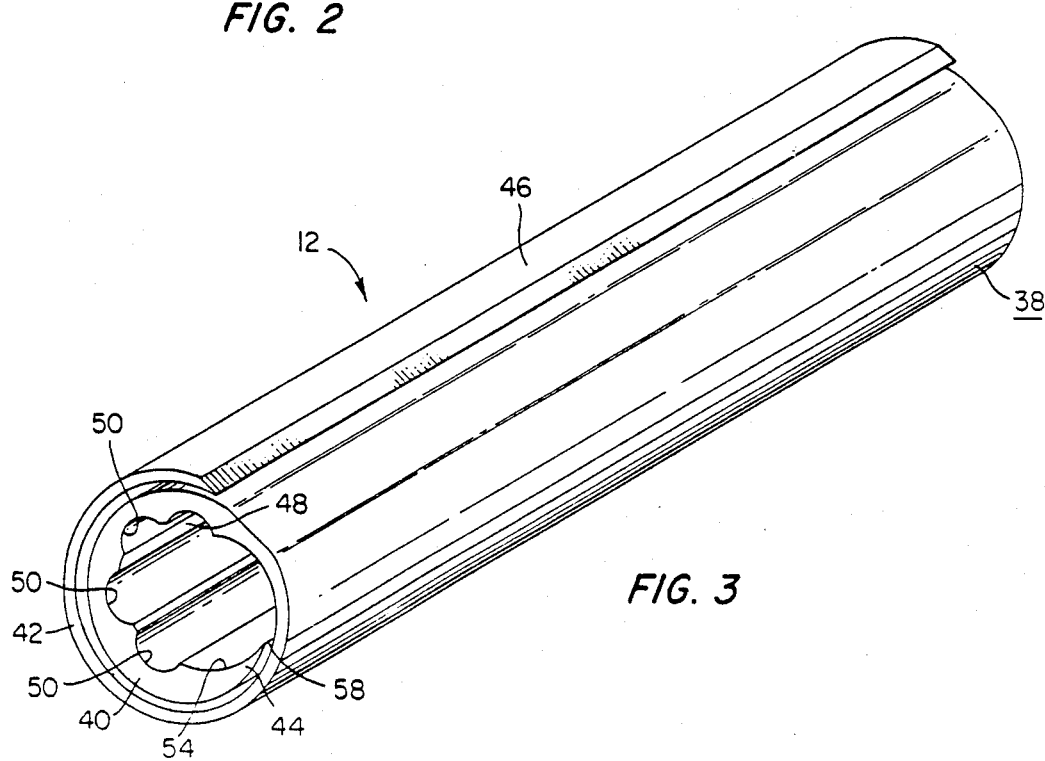
FIG. 3 is a perspective view of a form of a protective cover that may be used in the present invention.
Figure 4:
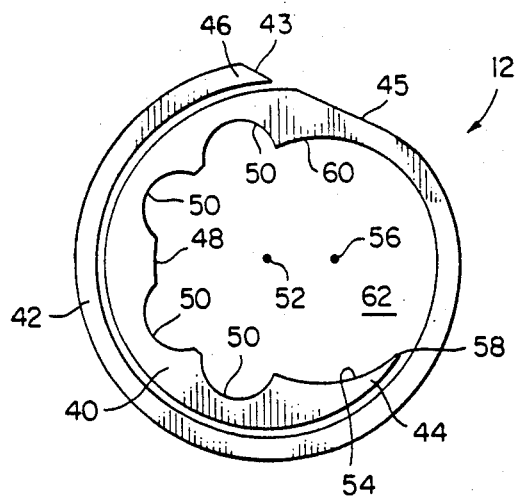
FIG. 4 is an end view of the protective cover of FIG. 3.

The taped connected cables are then covered by the protective splice cover 12, shown in more detail in FIGS. 3 and 4. The cover 12 comprises a generally cylindrical, elongate tubular member 38 made of flexible, rubber-like electrically insulating material. Preferably, the member 38 is made of neoprene, although other resilient nonconductive, elastomeric materials such as polyvinylchloride may also be used.

The tubular member 38 is formed to have circumferentially overlapping wall portions 40 and 42, the free ends 44 and 46 respectively of these wall portions preferably overlapping in spiral fashion at least 180 degrees so as to provide a double-walled cylinder over a significant circumferential portion of the member 38. The overlapping wall portions 40 and 42 are unsecured and free to be moved radially relative to each other and may be opened completely for installation over the connected cables. A tapered portion 43 may be provided at the edge of free end 46 and a flat portion 45 on the outer surface of the wall 40 to facilitate reception of and tightening by the straps 30.

In the inner circumferential surface 48, there is provided a plurality of recesses or grooves 50 that extend radially into the inner circumferential surface 48 and axially along the member 38. The grooves 50 are preferably arcuate and are spaced in an arc of revolution about the central axis 52 of the tubular member 38. On the inner surface of the free end 44 of the overlapped wall 40, there is an axially extending arcuate surface portion 54 having a radius of curvature of which the center 56 is offset with respect to the tubular member axis 52. The arcuate portion 54 is formed to have a radius of curvature less than that of the outer circumferential surface of the overlapped wall 50 and to intersect such outer wall surface of the free end 44 to form thereby a relatively sharp edge 58 extending longitudinally along the tubular member 38.

On the inner circumferential surface of the overlapped wall 40 there is provided at a location diametrically opposite the arcuate surface portion 54 and through its offset center 56 an arcuate surface section 60 extending axially along the member 38. Preferably, the arcuate section 60 is formed to have the same radius of curvature as the arcuate portion 54 with its center coinciding with center 56. Thus, the arcuate portion 54 and the arcuate section 60 together define an arcuate cavity 62 extending axially along the member 38 and being offset from the central member axis 52. The grooves 50 are formed to be in facing relation to the cavity 62 the walls of the most distant grooves 50 spaced along the arc of revolution intersecting the surfaces of the arcuate portion 54 and arcuate section 60, respectively. In the preferred form, the radius of curvature of the grooves 50 is smaller than the radius of curvature of the cavity 60.

The elongate tubular member 38 is formed to have a longitudinal dimension greater than the exposed conductor portion 34 (FIG. 2). In the preferred arrangement where the connected conductors and exposed portion 34 are covered with tape, the tubular member is formed preferably to have a length such that the ends of the member 38 extend axially beyond the edges of the tape on the cables. The tubular member 38 may, however, have a length less than the axial extent of the tape such that the member 38 lies completely over taped portions.

In the preferred form and for ease of manufacture, the grooves 50, arcuate portion 54 and arcuate section 60 all extend axially the full length of the member 38. The grooves 50, arcuate portion 54 and arcuate section 60 may, however, be formed to extend axially along a portion of the length of the member 38 such as at each end thereof.

The preferred configuration of the tubular member 38 is formed by extruding a sheet of neoprene forming thereby on such sheet the contours of the inner circumferential surface 48 as well as the shape of the grooves 50, the arcuate portion 54 and the arcuate section 60. To effect a moistureproof seal, it is preferred that the entire precontoured surface be coated with a sealing material, such as uncured butyl sealant, capable of adhering to itself and other materials and of sealing out moisture. A sheet of readily removable release paper may be applied over the sealant to protect the coated surfaces and facilitate handling as well as storage of the member.

To complete the preparation of the splice 10, the cover 12 is, upon removal of the release paper, placed around the connected cables and then closed thereover. The straps 30 are then secured around the outer surface of the cover 12 in known manner to radially compress the cover 12 and effect the sealed splice 10. To further assure sealing of the splice 10, beads of additional sealant may be applied between the smaller cables positioned around the larger cable 14 before installation of the cover 12 over the cables.

Figure 5:
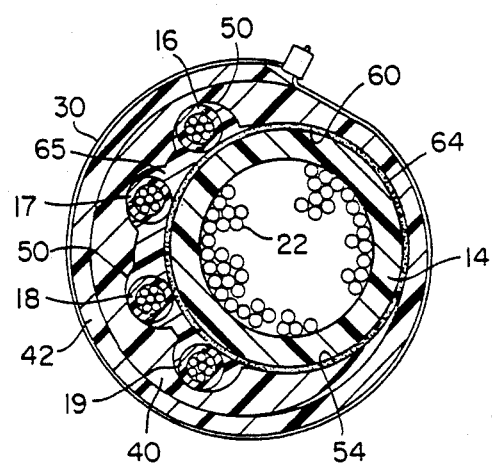
FIG. 5 is a cross-sectional view of the splice of FIG. 1 as seen along viewing lines V—V.

In FIG. 5 there is shown a cross-section of the completed splice 10 at a location of the cables adjacent the exposed portion 34 where the layer of sealant tape 64 (not shown in FIG. 2) overlaps onto the outer insulation of the cable 14. Upon tightening of the straps 30 around the cover 12, the overlapping wall portions 40 and 42 are brought into contact, the sealing material being compressed therebetween. The arcuate portion 54 and the arcuate section 60 with sealing material thereon compressively engage portions of the tape 64 wrapped around the larger cable 14. The walls of the grooves 50 with sealing material compressively engage portions of the smaller cables 16, 17, 18 and 19 and tightly hold these smaller cables against the tape 64 around the larger cable 14. Additional sealant 65 fills the voids between the smaller cables and combines with the sealant on the inner surfaces to provide an effective seal.

Figure 6:
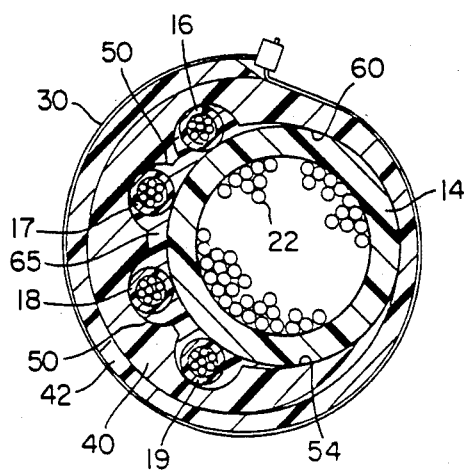
FIG. 6 is a cross-sectional view of the splice of FIG. 1 as seen along viewing lines VI—VI.

In FIG. 6, the sealed splice 10 is shown in cross-section at the end of the cover 12 that is formed in the preferred arrangement to extend beyond the ends of the tape covering the exposed conductors. At this region of the splice 10, there being no tape 64, the grooves 50 with sealant tightly engage the smaller cables 16, 17, 18 and 19 with filler sealant 65 therebetween while the arcuate portion 54 and arcuate section 60 with sealant both contact the larger cable 14.

It should now be appreciated that the splice of the present invention not only provides the desired protection and seal against a hostile environment, but also ease of installation by use of a pre-coated cover 12. Additional advantage is provided by the cover 12 in the wide range of electrical cables that can be effectively sealed due to its flexibility and specifically contoured inner surfaces. Telephone cables vary in diameter depending on the number of individual lines or pairs of lines included within the cable insulation. For example, one size cover can effectively seal four smaller cables at each end, each smaller cable having four to five pairs of lines to one larger cable having a range of from twenty-five to two hundred pairs of lines. Another single size cover can seal the same smaller cables to a larger cable having a range of from three hundred to nine hundred pairs of cables. Thus, the range of larger cables having between twenty-five and nine hundred pairs can be sealed with only two size covers. In comparison, for the same range of larger cables, it would take four different sizes of the available heat-shrinkable covers.

Although in the preferred embodiment the cover is pre-coated with sealing material, other sealing techniques may be used in which no sealant is pre-applied to the cover. For example, it may be desirable to enclose a cover having no sealant thereon with a tape having suitable adhesive and sealing materials thereon to not only effect the seal but also provide the compressive securement, eliminating thereby the use of the straps 30.

While the techniques hereindescribed have been directed to the sealing of exposed cables for splicing and tapping purposes, the methods of the present invention may also be utilized in other areas, such as in repair of damaged outer sheaths of electrical cables. For example, a quantity of sealing material 65 (FIG. 5), such as a high temperature uncured butyl sealant, may be applied to a portion of the damaged cable and hand molded or suitably pressed by other means into the damaged cable area. For restoration of mechanical strength in the damaged area, a layer of reinforcing material, such as a polyester film of MYLAR (Trademark of duPont), is placed onto the sealant material as by wrapping such material circumscribingly therearound. Other suitable reinforcing materials may also be used. Then, an elastomeric sheath or protective cover, such as cover 12 (FIG. 3) with split ends is placed about the reinforcing material and fastened to the cable by clamps or other reopenable compressing means as set forth hereinabove.

Since the cover is compressed by mechanical means and not vulcanized to the cable as by heat, the cover is formed of a heat-cured, rubber material, such as neoprene, and which may be different from the sealant material 65. The cover may be precoated with a film of mastic on its interior surface and the undulations and grooves provided therein for cable splicing purposes may be eliminated for cable repair use. The split ends of the cover are arranged to circumferentially overlap preferably at least one-and-one-half times around the cable to effect the desirable seal.

Various other changes to the foregoing, specifically disclosed embodiments and practices will be evident to those skilled in the art. Accordingly, the foregoing preferred embodiments are intended in an illustrative and not in a limiting sense. The true spirit and scope of the invention are set forth in the following claims.

I claim:

1. A method of sealably covering an exposed electrical cable comprising the steps of:
   applying sealant material around said exposed cable;
   placing a protective cover over said sealant material; and
   mechanically compressing said cover into contact with said sealant material to effect a seal between said cover and said cable.

2. A method according to claim 1, wherein said sealant material is applied by wrapping sealant tape over said exposed cable.

3. A method according to claim 1, wherein said sealant material is applied by disposing a quantity of such material onto the exposed cable.

4. A method according to claim 1, wherein said sealant material is applied by first wrapping sealant tape over said exposed cable and then by disposing an additional quantity of sealant material onto said tape.

5. A method according to claim 1, wherein said protective cover contains a coating of sealant on its surface that is arranged to contact said sealant material, such sealant providing a seal between the overlapped portions of said cover.

6. A method according to claim 1, wherein said cover is compressed by retentively maintaining clamping means circumscribingly about said cover.

7. A method of repairing a damaged electrical cable comprising the steps of:
   applying a sealant material around said damaged cable;
   placing a heat-cured protective cover over said sealant material; and
   non-heatably compressing said split cover into contact with said sealant material to provide a seal between said cover and said cable.

8. A method according to claim 7, wherein said compressing step is practiced by applying reopenable clamping means circumscribingly about said cover.

9. A method according to claim 1 wherein said placing step includes:
   overlapping portions of at least one protective cover around said sealant material.

* * * * *